US008548701B2

(12) United States Patent
Tsukamoto et al.

(10) Patent No.: US 8,548,701 B2
(45) Date of Patent: Oct. 1, 2013

(54) CONTROL DEVICE AND CONTROL METHOD FOR CONTINUOUSLY VARIABLE TRANSMISSION

(75) Inventors: Shin Tsukamoto, Fukuroi (JP); Tooru Yokota, Sagamihara (JP)

(73) Assignee: Jatco Ltd, Fuji-shi (JP)

( * ) Notice: Subject to any disclaimer, the term of this patent is extended or adjusted under 35 U.S.C. 154(b) by 824 days.

(21) Appl. No.: 12/572,446

(22) Filed: Oct. 2, 2009

(65) Prior Publication Data

US 2010/0087997 A1   Apr. 8, 2010

(30) Foreign Application Priority Data

Oct. 7, 2008   (JP) .................................. 2008-260421

(51) Int. Cl.
*G06F 19/00*   (2011.01)

(52) U.S. Cl.
USPC .......................................................... 701/60

(58) Field of Classification Search
USPC ............................................... 701/54, 60, 61
See application file for complete search history.

(56) References Cited

U.S. PATENT DOCUMENTS

| 6,829,528 | B1 * | 12/2004 | Kang et al. ...................... 701/51 |
| 2006/0155452 | A1 | 7/2006 | Strenkert |
| 2006/0183596 | A1 | 8/2006 | Etchason et al. |
| 2007/0265135 | A1 * | 11/2007 | Ido ................................. 477/34 |

FOREIGN PATENT DOCUMENTS

| JP | 62-286847 A | | 12/1987 |
| JP | 62-296847 A | * | 12/1987 |
| JP | 09-217824 A | | 8/1997 |
| JP | 2004-190492 A | * | 7/2004 |
| JP | 2005-263061 A | | 9/2005 |

* cited by examiner

*Primary Examiner* — John Q Nguyen
*Assistant Examiner* — Rodney P King
(74) *Attorney, Agent, or Firm* — Foley & Lardner LLP (57) ABSTRACT

A transmission controller determines whether an oil temperature in the CVT is higher than a high oil temperature control starting temperature or not. If it is determined that the oil temperature is higher than the high oil temperature control starting temperature, a first oil temperature lowering processing which limits an input rotation speed of the CVT by changing a speed ratio of the CVT smaller is executed. If the input rotation speed of the CVT reaches a predetermined lower limit rotation speed during execution of the first oil temperature lowering processing, the first oil temperature lowering processing is ended and a second oil temperature lowering processing that limits a torque of an engine is executed.

12 Claims, 7 Drawing Sheets

CONTROL DEVICE AND CONTROL METHOD FOR CONTINUOUSLY VARIABLE TRANSMISSION

FIELD OF THE INVENTION

The present invention relates to a control of a continuously variable transmission, and in particular to a control at the time when an oil temperature is high.

BACKGROUND OF THE INVENTION

With regards to a continuously variable transmission (hereinafter referred to as "CVT"), if an oil temperature in the CVT rises due to a high speed running, a high load running, etc., a viscosity of oil falls and it causes a low lubrication performance and causes a fall of a power transmitting capacity. For this reason, in JP62-286847A, if the oil temperature in the CVT exceeds a predetermined temperature, an input rotation speed of the CVT is limited by changing a speed ratio of the CVT smaller. Moreover, in JP2004-190492A, if the oil temperature in the CVT goes into a predetermined temperature zone, an engine torque is limited to lower a vehicle speed and to reduce a friction in the CVT. By using either of the above methods, it is possible to reduce a heat generation amount of the CVT and to reduce the oil temperature in the CVT.

SUMMARY OF THE INVENTION

According to the method of JP62-286847A which limits the input rotation speed of the CVT, it can expect a prompt fall of the oil temperature. Moreover, even if the input rotation speed is being limited, since the engine torque increases and the speed at that time can be maintained if a driver depresses an accelerator pedal more, a sense of discomfort given to the driver is small. However, with this method, when the speed ratio of the CVT reaches a Highest speed ratio (minimum speed ratio) of the CVT, it cannot limit the input rotation speed furthermore, and therefore, there may be a case where the oil temperature in the CVT cannot be lowered to the desired temperature.

Moreover, according to the method of JP2004-190492A which restricts the engine torque, it is possible to lower the oil temperature in the CVT, but the sense of discomfort given to the driver is large since the fall of the engine torque causes a fall in a running performance. Moreover, the pace of decrease in the vehicle speed due to the fall of the engine torque is not so large as the pace of decrease in the input rotation speed in the case of limiting the input rotation speed, and there is a time lag until the vehicle speed falls in response to the fall of the engine torque, and therefore, it cannot expect a prompt fall in the oil temperature as the case where the rotation speed is reduced.

In the case where the oil temperature in the CVT cannot be lowered to a desired temperature, or where it takes a long time until lowering to the desired temperature, it is not desirable in that the sense of discomfort given to the driver and the fall of the running performance due to the high oil temperature control continue for a long time.

According to an aspect of the present invention, a control device of a continuously variable transmission which changes a speed ratio continuously is provided. The control device comprises a high oil temperature control starting determination unit which determines whether an oil temperature of the transmission is higher than a high oil temperature control starting temperature, a first oil temperature lowering unit which executes a first oil temperature lowering processing that limits an input rotation speed of the transmission by changing a speed ratio of the transmission smaller if it is determined that the oil temperature is higher than the high oil temperature control starting temperature by the high oil temperature control starting determination unit, and a second oil temperature lowering unit which ends the first oil temperature lowering processing and executes a second oil temperature lowering processing that limits a torque of an engine if the input rotation speed of the transmission reaches a lower limit rotation speed during the first oil temperature lowering processing.

According to another aspect of the present invention, a control method for a continuously variable transmission which changes a speed ratio continuously, is provided. The control method comprises a high oil temperature control starting determination step for determining whether an oil temperature of the transmission is higher than a high oil temperature control starting temperature, a first oil temperature lowering step for executing a first oil temperature lowering processing that limits an input rotation speed of the transmission by changing a speed ratio of the transmission smaller if it is determined that the oil temperature is higher than the high oil temperature control starting temperature by the high oil temperature control starting determination step, and a second oil temperature lowering step for ending the first oil temperature lowering processing and executing a second oil temperature lowering processing that limits a torque of an engine if the input rotation speed of the transmission reaches a lower limit rotation speed during the first oil temperature lowering processing.

According to these aspects of the present invention, if the oil temperature of the transmission is greater than or equal to the high oil temperature control starting temperature, the high oil temperature control starts, and first, the input rotation speed of the transmission is limited by the first oil temperature lowering processing. Thereby, the oil temperature of the transmission can be reduced promptly.

Even if it is a case where the input rotation speed of the transmission reaches the lower limit rotation speed before the oil temperature of the transmission falls to a desired temperature, according to these aspects of the present invention, the second oil temperature lowering processing is performed continuously, and engine torque is limited. Thereby, it is possible to lower the oil temperature of the transmission further and to lower the oil temperature of the transmission to the desired temperature reliably.

Embodiments and advantages of this invention will be described in detail below with reference to the attached figures.

DETAILED DESCRIPTION OF THE PREFERRED EMBODIMENT

Hereafter, the embodiment of the present invention will be described with reference to the accompanying drawings. It is noted that in the following description, a "speed ratio" of a transmission means a value obtained by dividing an input rotation speed of the transmission by an output rotation speed of the transmission. Moreover, a "Lowest speed ratio" means a maximum speed ratio of the transmission, and a "Highest speed ratio" means a minimum speed ratio of the transmission.

Figure 1:
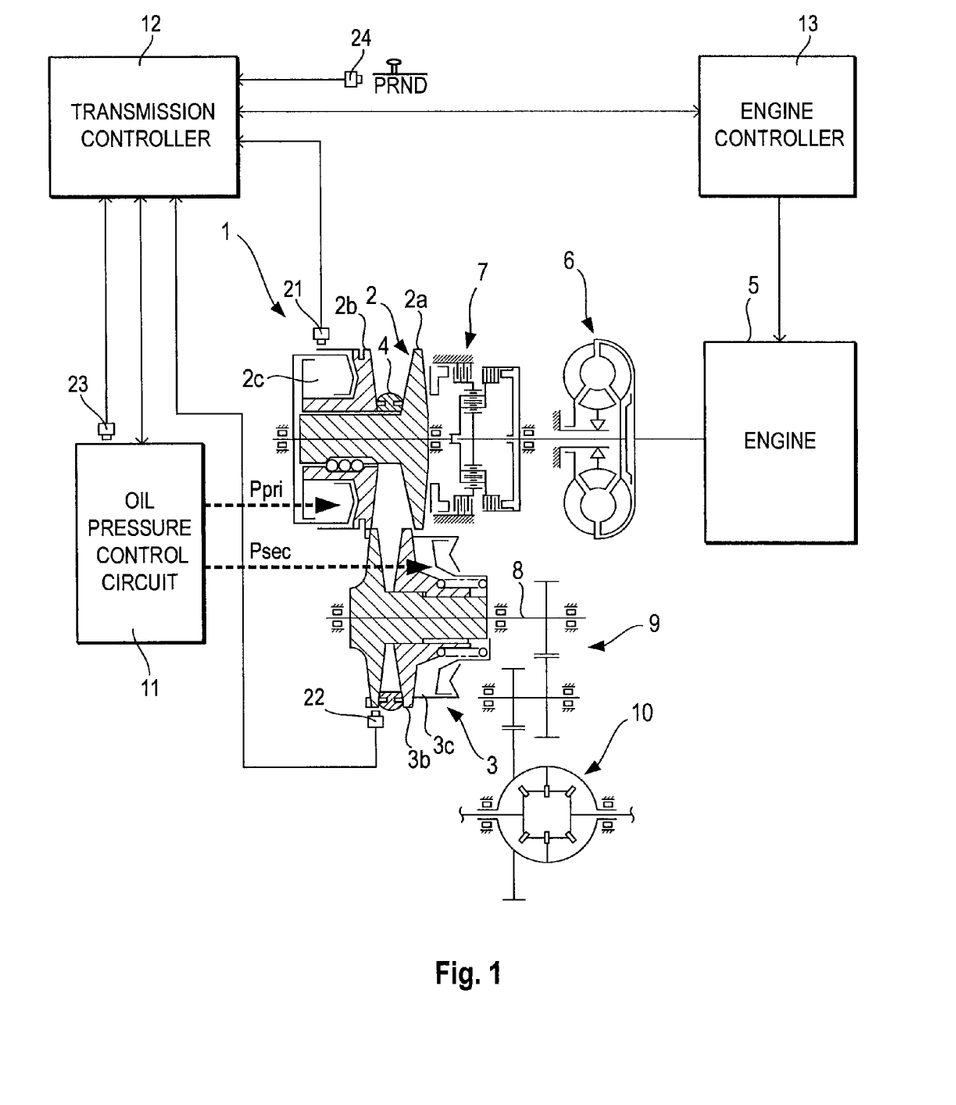
FIG. 1 depicts a schematic structure of a vehicle having a belt type continuously variable transmission.

FIG. 1 depicts a schematic structure of a vehicle equipped with a belt type continuously variable transmission (hereinafter referred to as "CVT 1"). A primary pulley 2 and a secondary pulley 3 are arranged so that V grooves on these pulleys 2, 3 align, and a V belt 4 is wrapped around the V grooves on these pulleys 2, 3. An engine 5 is arranged coaxially with the primary pulley 2. Between the engine 5 and the primary pulley 2, there are provided in an order from the engine 5 side, a torque converter 6 and a forward and reverse switch mechanism 7.

A rotation of the primary pulley 2 is transmitted to the secondary pulley 3 through the V belt 4, and a rotation of the secondary pulley 3 is transmitted to drive wheels (not illustrated) through an output shaft 8, a gear train 9, and a differential gear unit 10.

In order to enable change of the speed ratio between the primary pulley 2 and the secondary pulley 3 during the power transmission, one of conical plates which form the V grooves on the primary pulley 2 or secondary pulley 3 is used as a fixed conical plate 2a, 3a, and the other conical plate 2b, 3b is used as a movable conical plate which can be displaced in an axial direction.

These movable conical plates 2b and 3b are thrusted towards the fixed conical plates 2a and 3a by supplying a primary pulley pressure Ppri and a secondary pulley pressure Psec which are generated using the line pressure as an original pressure to a primary pulley chamber 2c and a secondary pulley chamber 3c, and thereby, a friction between the V belt 4 and the conical plates is created to transmit power between the primary pulley 2 and the secondary pulley 3.

Upon shifting, the widths of V grooves on both pulleys 2 and 3 are changed using a difference pressure between the primary pulley pressure Ppri and the secondary pulley pressure Psec, which were generated to correspond to a target speed ratio. The change of the target speed ratio is achieved by continuously changing contact diameters between the V belt 4 and the pulleys 2, 3.

The primary pulley pressure Ppri and the secondary pulley pressure Psec are controlled by an oil pressure control circuit 11. The oil pressure control circuit 11 consists of a plurality of channels and a plurality of control valves, and responds to a shift control signal from a transmission controller 12 to control the primary pulley pressure Ppri and the secondary pulley pressure Psec.

Figure 2:
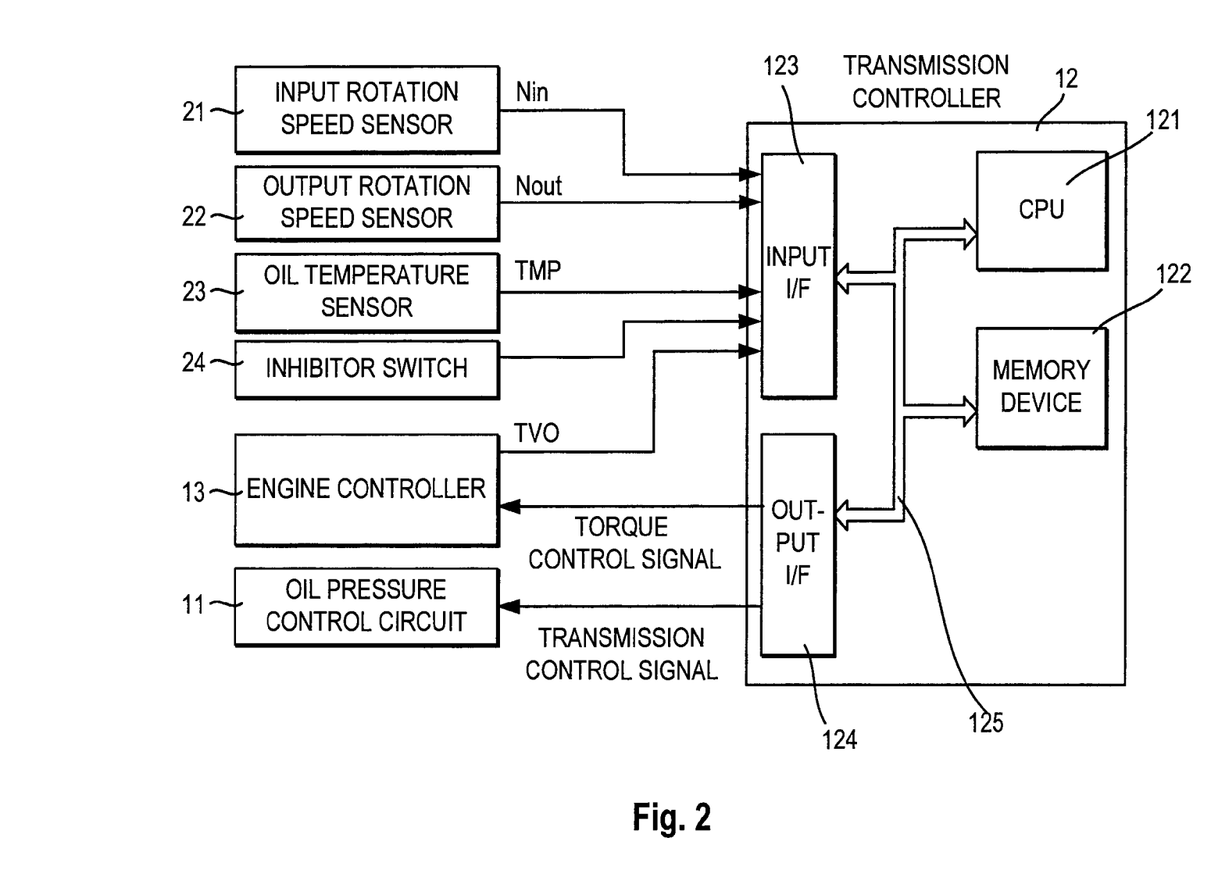
FIG. 2 depicts a schematic structure of a transmission controller.

As shown in FIG. 2, the transmission controller 12 consists of a CPU 121, a memory device 122 which consists of RAMs and ROMs, an input interface 123, an output interface 124, and a bus 125 that connects these elements each other.

Signals such as an output signal of an input rotation speed sensor 21 which detects a rotation speed of the primary pulley 2 (hereinafter referred to as an "input rotation speed Nin"), an output signal of an output rotation speed sensor 22 which detects a rotation speed of the secondary pulley 3 (hereinafter referred to as an "output rotation speed Nout"), an output signal of an oil temperature sensor 23 which detects an oil temperature TMP of the CVT 1, an output signal of an inhibitor switch 24 which detects a position of a select lever are inputted into the input interface 123. Moreover, a signal which shows an operational status of the engine 5, which contains a signal showing a degree of an opening of a throttle valve of the engine 5 (hereinafter referred to as a "throttle opening TVO") from an engine controller 13 is inputted into the input interface 123.

Figure 5:
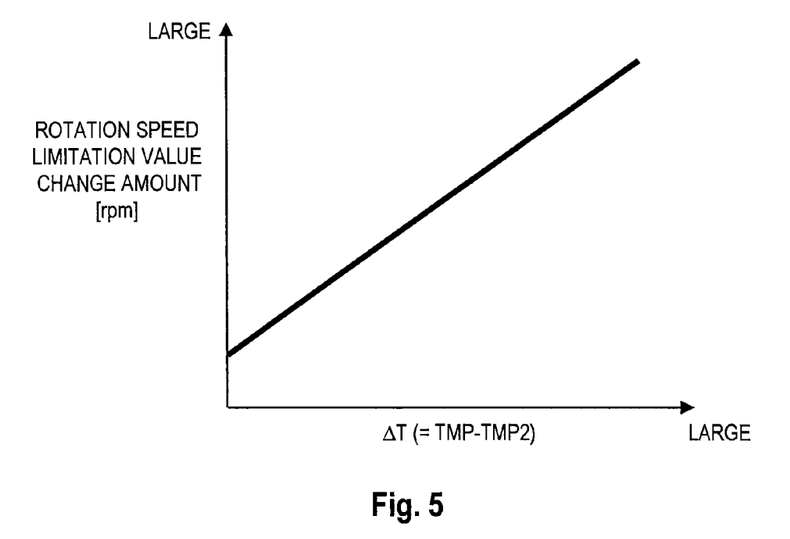
FIG. 5 depicts a table for setting an amount of change in a rotation speed limitation value.
Figure 6:
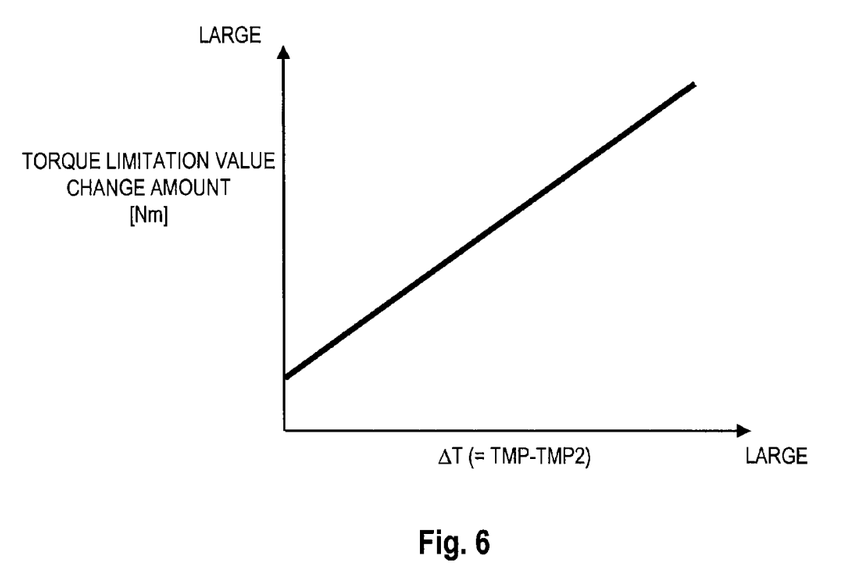
FIG. 6 depicts a table for setting an amount of change in a torque limitation value.

A program for controlling the transmission of the CVT 1, and a shift map (FIG. 3) used by the program for controlling the transmission, a program for a high oil temperature control, and various tables (FIG. 5, FIG. 6) used in the program for the high oil temperature control are stored in the memory device 122.

The CPU 121 reads and executes various programs stored in the memory device 122, generates control signal by applying various processing to various signals inputted through the input interface 123, and outputs the generated control signals to the oil pressure control circuit 11 and the engine controller 13 via the output interface 124. The various values used by the CPU 121 for the processing and calculated results are suitably stored in the memory device 122.

Figure 3:
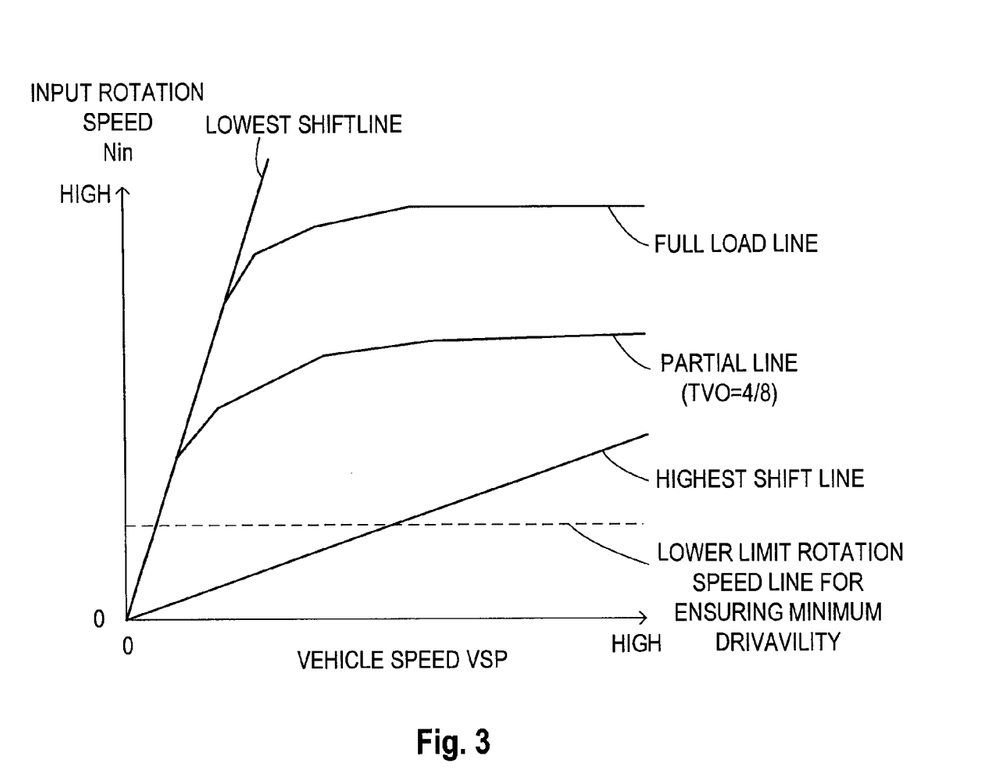
FIG. 3 depicts an example of a shift map.

Upon the shift control, the transmission controller 12 sets the target speed ratio of the CVT 1 with reference to the shift map shown in FIG. 3 based on the input rotation speed Nin, the vehicle speed VSP ($\propto$ output rotation speed Nout), and the throttle opening TVO. Then, the transmission controller 12 outputs a control signal to the oil pressure control circuit 11 so that the actual speed ratio of the CVT 1 becomes the target speed ratio, and controls the primary pulley pressure Ppri and the secondary pulley pressure Psec.

In the shift map in FIG. 3, only a full load line which is a shift line where the throttle opening TVO is the maximum, a partial line where the throttle opening TVO is 4/8, a Highest shift line where the speed ratio of the CVT 1 is the minimum, a Lowest shift line where the speed ratio of the CVT 1 is the maximum, and a lower limit rotation speed line for ensuring a minimum drivability corresponding to a lower limit rotation speed for ensuring the minimum drivability, which will be described later, are shown. However, the shift line is set for every throttle opening TVO in the actual shift map.

The transmission controller 12 monitors the oil temperature TMP of the CVT 1 during the shift control. If the oil temperature TMP rises due to high speed running, high load running, etc., and the oil temperature TMP exceeds predetermined high temperature (for example, 120° C., and hereinafter referred to as "a high oil temperature control starting temperature TMP1"), the transmission controller 12 starts the high oil temperature control for lowering the oil temperature TMP.

The high oil temperature control consists of a first oil temperature lowering processing and a second oil temperature lowering processing, and the transmission controller 12 executes the first oil temperature lowering processing first.

In the first oil temperature lowering processing, the transmission controller 12 limits the input rotation speed Nin of the CVT 1 by changing the speed ratio of the CVT 1 towards a "small" side (rotation speed limitation). When the input rotation speed Nin of the CVT 1 declines by the rotation speed limitation, the oil temperature TMP of the CVT 1 falls, and when the oil temperature TMP falls to a desired temperature (for example, 100° C., and hereinafter referred to as "a high oil temperature control ending temperature TMP2"), the high oil temperature control ends.

However, in the case where the oil temperature TMP of the CVT 1 does not fall to the high oil temperature control ending temperature TMP2 even if the input rotation speed Nin of the CVT 1 reaches a predetermined lower limit rotation speed, the transmission controller 12 executes the second oil temperature lowering processing. The lower limit rotation speed is set to the larger one of a "Highest rotation speed" and a "Lower limit rotation speed for ensuring the minimum drivability". The "Highest rotation speed" is the input rotation speed Nin of the CVT 1 when the speed ratio of the CVT 1 changes to the Highest speed ratio. The "Lower limit rotation speed for ensuring the minimum drivability" is the lower limit of the input rotation speed Nin of the CVT 1 (for example, it is set to 2000 rpm-3000 rpm) where the vehicle can run at a predetermined vehicle speed (for example, it is set to 60 km/h).

In the second oil temperature lowering processing, first, the transmission controller 12 outputs the torque control signal to the engine controller 13, and limits the torque Te of the engine 5 (torque limitation). At this time, the transmission controller 12 outputs the shift control signal to the oil pressure control circuit 11 so that the input rotation speed Nin of the CVT 1 is maintained at the rotation speed limitation value at that time.

If the torque Te of the engine 5 falls by the torque limitation, the vehicle speed VSP falls and the speed ratio of the CVT 1 changes to "large" side. As a result, it becomes possible to further lower the input rotation speed Nin of the CVT 1 by changing the speed ratio of the CVT 1 to "small" side again, and therefore, under such a situation, the transmission controller 12 outputs the shift control signal to the oil pressure control circuit 11 so that the speed ratio of the CVT 1 is changed to "small" side, and further limits the input rotation speed Nin of the CVT 1.

Henceforth, in the second oil temperature lowering processing, the transmission controller 12 performs the torque limitation of the engine 5 and the rotation speed limitation of the CVT 1 alternately, and thereby, it further lowers the oil temperature TMP of the CVT 1, and ends the high oil temperature control when the oil temperature TMP fell to the high oil temperature control ending temperature TMP2.

Figure 4:
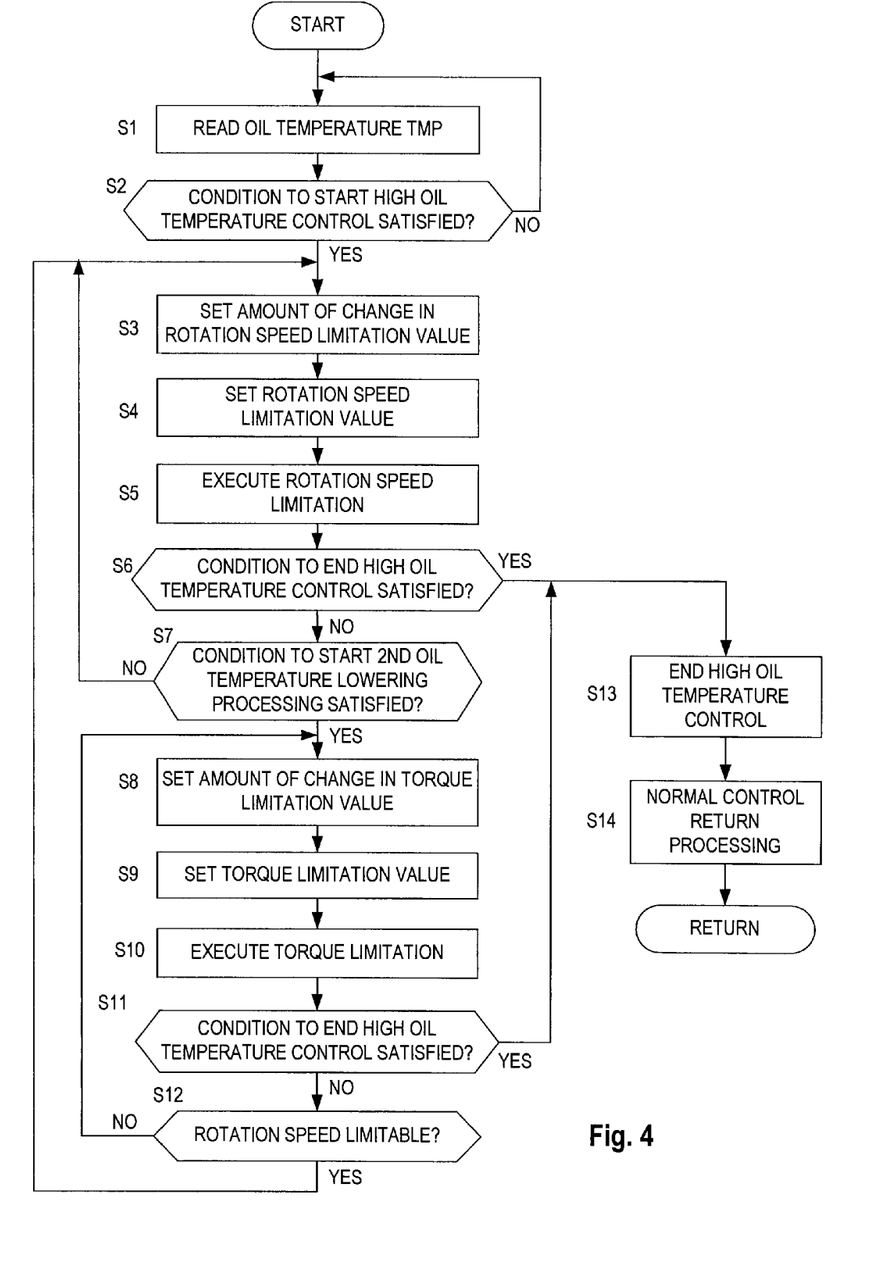
FIG. 4 depicts a flow chart which shows an example of a program for a high oil temperature control.

FIG. 4 depicts an example of the program for the high oil temperature control by the transmission controller 12. This program is stored in the memory device 122, and is repeatedly executed in the CPU 121 during the shift control. The high oil temperature control which the transmission controller 12 executes will be described in detail with reference to FIG. 4.

At Step S1, the oil temperature TMP of the CVT 1 is read.

At Step S2, it is determined whether the condition to start the high oil temperature control is satisfied or not. For example, it is determined that the condition to start the high oil temperature control is satisfied when the oil temperature TMP of the CVT 1 becomes greater than or equal to the high oil temperature control starting temperature TMP1. If it is determined that the condition to start the high oil temperature control is satisfied, the process proceeds to Step S3 and beyond, and the first oil temperature lowering processing that limits the input rotation speed of the CVT 1 is executed. If it is determined that the condition to start the high oil temperature control is not satisfied, the process returns to Step S1 and continues the monitoring of the oil temperature TMP of the CVT 1.

At Step S3, the amount of change in the rotation speed limitation value is set. The amount of change in the rotation speed limitation value is set referring to the table shown in FIG. 5, and the larger the difference ΔT between the present oil temperature TMP of the CVT 1 and the high oil temperature control ending temperature TMP2, the larger the value is set. This is because the larger the present oil temperature TMP of the CVT 1 is, it is necessary to promptly lower the rotation speed limitation value, which will be described later and promptly lower the rotation speed of the CVT 1 promptly, and to promptly lower the oil temperature TMP.

At Step S4, the rotation speed limitation value is set. If the previous value of the rotation speed limitation value exists, the value obtained by subtracting the amount of change in the rotation speed limitation value set at Step S3 from the previous value is set as a new rotation speed limitation value.

If the previous value of the rotation speed limitation value does not exist, the input rotation speed Nin of the CVT 1 at the time when the condition to start the high oil temperature control is satisfied is set as an initial value of the rotation speed limitation value. This is because the limitation of the input rotation speed Nin of the CVT 1 is performed by lowering the rotation speed limitation value by the amount of the change in the rotation speed limitation value, and by limiting the input rotation speed Nin to the rotation speed limitation value when the input rotation speed Nin exceeds the rotation speed limitation value, and therefore, the initial value is set to a value close to the present input rotation speed Nin of the CVT 1 so that the limitation of the input rotation speed Nin is started promptly.

However, if the input rotation speed Nin of the CVT 1 at the time when the condition to start the high oil temperature control is satisfied is used as the initial value without modification, if the driver is operating the accelerator pedal immediately before the condition to start the high oil temperature control is satisfied, it may take time before the input rotation speed Nin is actually limited, or the rotation speed limitation may be performed rapidly. For example, since the initial value becomes a large value if the driver depresses the accelerator pedal more so as to increase the input rotation speed of the CVT 1, it takes time until the rotation speed limitation value falls and the limitation of the input rotation speed Nin starts. On the contrary, if the driver releases the accelerator pedal so that the input rotation speed Nin of the CVT 1 is lowered, the initial value becomes a small value, and the input rotation speed Nin of the CVT 1 falls rapidly simultaneously with the start of the high oil temperature control to give sense of discomfort to the driver.

For this reason, as for the initial value of the rotation speed limitation value, instead of the input rotation speed Nin of the CVT 1 when the condition to start the high oil temperature control is satisfied, it may use an average value (weighted average value, arithmetic average value, etc.) of the input rotation speed Nin of the predetermined period before the condition to start the high oil temperature control is satisfied (for example, period from the time when the oil temperature TMP of the CVT 1 exceeds the high oil temperature control ending temperature TMP2 until it reaches the high oil temperature control starting temperature TMP1).

At Step S5, the rotation speed limitation of the CVT 1 is performed. In the rotation speed limitation, the input rotation speed Nin of the CVT 1 and the rotation speed limitation value set at Step S4 are compared, the shift control signal is transmitted to the oil pressure control circuit 11 from the transmission controller 12 so that the speed ratio of the CVT 1 is changed to "small" side if the input rotation speed Nin is larger than the rotation speed limitation value, and the input rotation speed Nin is limited by the rotation speed limitation value.

At Step S6, it is determined whether the condition to end the high oil temperature control is satisfied or not. For example, it is determined that the condition to end the high oil temperature control is satisfied if the oil temperature TMP of the CVT 1 becomes lower than the high oil temperature control ending temperature TMP2. If it is determined that the condition to end the high oil temperature control is satisfied, the process proceeds to Step S13, and the high oil temperature control ends (nullification of the limitation value), and thereafter, a usual control return processing, which changes the speed ratio of the CVT 1 to the target speed ratio determined from the present vehicle speed VSP and the present throttle opening TVO, by a predetermined change rate.

If the condition to end the high oil temperature control is not satisfied, the process proceeds to Step S7, and it is determined whether the condition to start the second oil temperature lowering processing is satisfied or not. In the first oil temperature lowering processing, as described in above, the oil temperature TMP of the CVT 1 is lowered by limiting the input rotation speed Nin of the CVT 1. However, if the input rotation speed Nin reaches the Highest rotation speed before the oil temperature TMP of the CVT 1 falls to the high oil temperature control ending temperature TMP2, the input rotation speed Nin cannot be lowered any more. Moreover, when the input rotation speed Nin reaches the lower limit rotation speed for ensuring the minimum drivability, it is not desirable to lower the input rotation speed Nin any more from a viewpoint of securing the running performance.

Therefore, the transmission controller 12 sets the higher one between the Highest rotation speed and the lower limit rotation speed for ensuring the minimum drivability as the lower limit rotation speed. During the execution of the first oil temperature lowering processing, if the input rotation speed Nin reaches the lower limit rotation speed, it determines that the condition to start the second oil temperature lowering processing is satisfied, and ends the first oil temperature lowering processing, and the process proceeds to Step S8 and afterwards to execute the second oil temperature lowering processing. Since it is possible to further reduce the input rotation speed Nin of the CVT 1 to lower the oil temperature TMP of the CVT 1 if the condition to start the second oil temperature lowering processing is not satisfied, the process returns to Step S3 so as to continue the first oil temperature lowering processing and to continue the limitation of the input rotation speed Nin of the CVT 1.

In the second oil temperature lowering processing, first, the amount of change in the torque limitation value is set at Step S8. The amount of change in the torque limitation value is set by referring to the table shown in FIG. 6, and the larger the difference ΔT between the present oil temperature TMP of the CVT 1 and the high oil temperature control ending temperature TMP2 is, the larger the amount of change in the torque limitation value is set. This is because the higher the present oil temperature TMP of the CVT 1 is, it is necessary to promptly lower a torque limitation value, which will be described later, to lower the torque Te of the engine 5 promptly, and to lower the oil temperature TMP more promptly.

At the following step S9, the torque limitation value is set. If the previous value of the torque limitation value exists, a new torque limitation value is set to a value obtained by subtracting the previous value by the amount of change in the torque limitation value set at Step S8.

If the previous value of the torque limitation value does not exist, the torque Te of the engine 5 at the time when the condition to start the second oil temperature lowering processing is satisfied is set as an initial value of the torque limitation value. This is because the torque limitation of the engine 5 is performed by lowering the torque limitation value by the amount of change in the torque limitation value and by restricting the torque Te of the engine 5 when the torque Te of the engine 5 exceeds the torque limitation value as described later, and therefore, the initial value is set to a value near the torque Te of the engine 5 to promptly start the limitation of the torque Te of the engine 5.

However, if the torque Te of the engine 5 at the time when the condition to start the second oil temperature lowering processing is satisfied is used as the initial value without modification, if the driver is operating the accelerator pedal immediately before the condition is satisfied, the limitation of the torque Te of the engine 5 may delay or the torque limitation may be done rapidly. For example, if the driver depresses the accelerator pedal more to increase the torque Te of the engine 5, the initial value becomes large, and therefore, it needs time to start the limitation of the torque Te of the engine 5 after the torque limitation value becomes lower. On the contrary, if the driver releases the accelerator pedal and the torque Te of the engine 5 becomes small, the initial value becomes a small value, and therefore, the torque Te of the engine 5 falls rapidly simultaneously with the start of the torque limitation to give sense of discomfort to the driver and it causes rapid fall of the running performance.

For this reason, as for the initial value of the torque limitation value, instead of using the torque of the engine 5 at the time when the condition to start the second oil temperature lowering processing is satisfied, an average value (weighted average efficiency, arithmetic average value, etc.) of the torque Te of the engine 5 of a predetermined period before the condition is satisfied (for example, the period from the satisfaction of the condition to start the high oil temperature control until the satisfaction of the condition to start the second oil temperature lowering processing) may be used.

At Step S10, the torque limitation of the engine 5 is performed. In the torque limitation, the torque Te of the engine 5 is compared with the torque limitation value set at Step S9, and if the torque Te of the engine 5 is larger than the torque limitation value, the torque control signal is sent to the engine controller 13 from the transmission controller 12 so that the torque Te of the engine 5 is lowered, to limit the torque Te of the engine 5 to the torque limitation value. It is noted that at this time, the shift control signal is sent to the oil pressure control circuit 11 from the transmission controller 12 so that the input rotation speed Nin of the CVT 1 is maintained at the rotation speed limitation value at that time, and the shift control of the CVT 1 is performed together.

At Step S11, it is determined whether the condition to end the high oil temperature control is satisfied or not. The condition to end the high oil temperature control is determined as satisfied when the oil temperature TMP of the CVT 1 becomes lower than the high oil temperature control ending temperature TMP2. If it is determined that the condition to end the high oil temperature control is satisfied, the process proceeds to Step S13 to end the high oil temperature control (omission of the limitation value), and at Step S14, a usual control return processing which changes the speed ratio of the CVT 1 and the torque of the engine 5 by a predetermined change rate to the target speed ratio and the target torque, respectively, decided from the present vehicle speed VSP and the present throttle opening TVO.

If the condition to end the high oil temperature control is not satisfied, the process proceeds to Step S12, and it is determined whether the rotation speed limitation is possible or not. Whether the rotation speed limitation is possible or not may be determined by determining whether the difference ΔNin between the input rotation speed Nin of the CVT 1 and the lower limit rotation speed is greater than or equal to a predetermined value or not. If the difference ΔNin is greater than or equal to the predetermined value, it is determined that the rotation speed limitation is possible and the process returns to Step S3, and the rotation speed limitation of the CVT 1 is performed again. If the rotation speed limitation of the CVT 1 is performed in the second oil temperature lowering processing, the torque control signal is sent to the engine controller 13 from the transmission controller 12 so that the torque Te of the engine 5 is maintained at the torque limitation value at that time, and the torque control of the engine 5 is performed together.

For example, if the lower limit rotation speed is set to the Highest rotation speed, it becomes possible to perform the rotation speed limitation when the vehicle speed falls by the torque limitation and the operating point of the CVT 1 separates from the Highest shift line so that the difference ΔNin becomes large. If such a situation arises, the rotation speed limitation of the CVT 1 is performed again. However, if the lower limit rotation speed is set to the lower limit rotation speed for ensuring the minimum drivability, since the input rotation speed Nin is maintained at the lower limit rotation speed for ensuring the minimum drivability even if the vehicle speed falls by the torque limitation, essentially, there will not be a situation where it is possible to perform the rotation speed limitation, and therefore, only the torque limitation is continuously performed.

If it is determined that the rotation speed restriction is not possible, the process returns to Step S8 and torque limitation of the engine 5 is performed again.

Therefore, in the second oil temperature lowering processing, in a case where the torque limitation of Steps S8 to S10 is performed and it becomes possible to perform the rotation speed restriction by the torque limitation, the rotation speed limitation of Steps S3 to S5 is performed again. Thereafter, the torque limitation and the rotation speed limitation are performed alternately until the condition to end the high oil temperature control is satisfied.

Now, advantageous effects by performing the above-described high oil temperature control are described.

Figure 7:
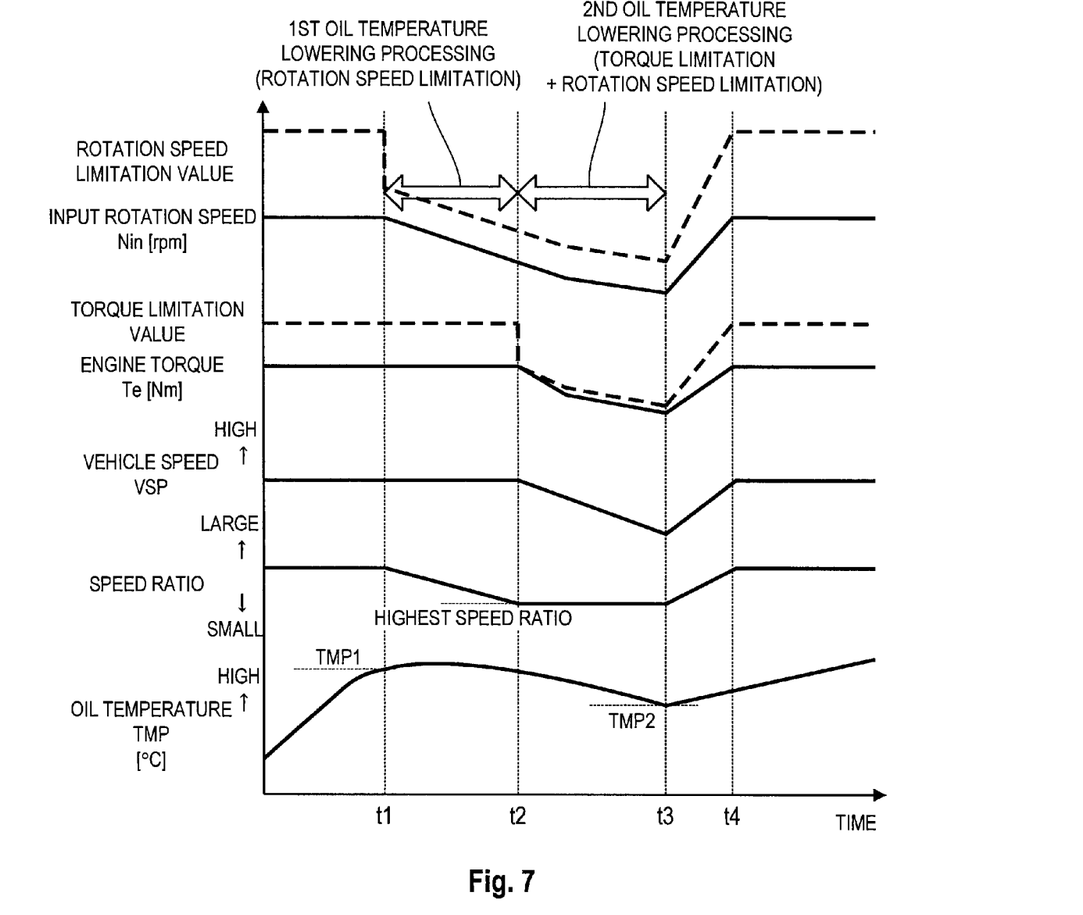
FIG. 7 depicts a time chart for illustrating an operation during a high oil temperature control.
Figure 8A:
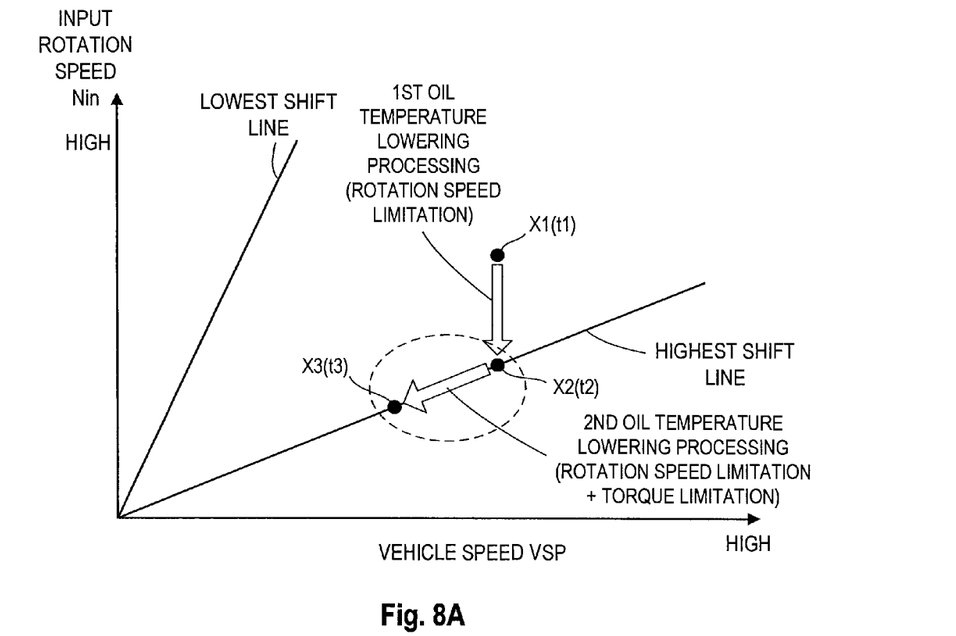
FIG. 8A depicts a diagram for illustrating an operation during the high oil temperature control.
Figure 8B:
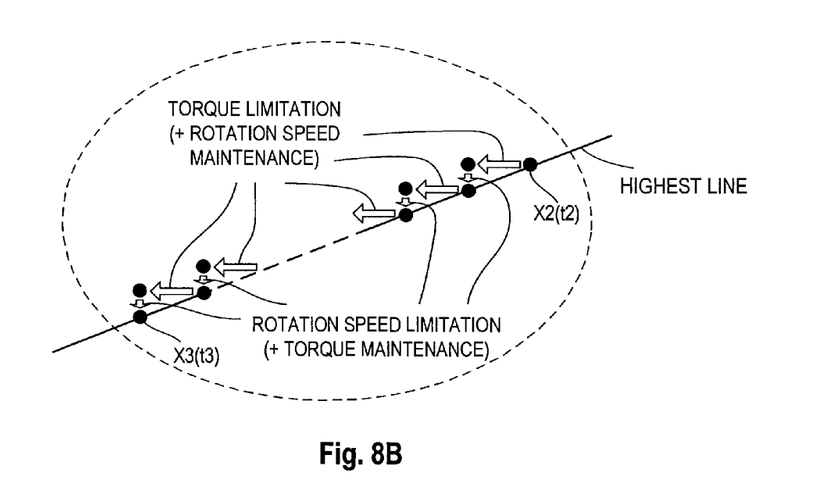
FIG. 8B depicts a partial expanded view in FIG. 8A.

FIG. 7 depicts a time chart where the oil temperature TMP of the CVT 1 rises and the above-described high oil temperature control is performed. FIG. 8A depicts a diagram showing how the operating point of the CVT 1 moves in the shift map at that time, and FIG. 8B is a magnified view of the portion enclosed with the broken line in FIG. 8A.

If the oil temperature TMP of the CVT 1 rises due to high speed running, high load running, etc., and the oil temperature TMP reaches the high oil temperature control starting temperature TMP1 at time t1, the condition to start the high oil temperature control is satisfied, and the first oil temperature lowering processing is started. In the first oil temperature lowering processing, the input rotation speed Nin of the CVT 1 is limited by the rotation speed limitation value, which is reduced with time. Thereby, the operating point of the CVT 1 moves from a point X1 towards a point X2 on the shift map in FIG. 8A. It is noted that it is assumed that the driver is pressing down the accelerator pedal so that the vehicle speed VSP is maintained at this time.

If the speed ratio of the CVT 1 reaches the Highest speed ratio at time t2 and the input rotation speed Nin reaches the lower limit rotation speed (in this example, it is the Highest rotation speed), the first oil temperature lowering processing ends and the second oil temperature lowering processing starts. In the second oil temperature lowering processing, the torque limitation which limits the torque of the engine 5 with the torque limitation value which is reduced with time, and the rotation speed limitation which limits the input rotation speed of the CVT 1 with the input rotation speed limitation value which is reduced with time, as in the first oil temperature lowering processing, are performed alternately. Thereby, the operating point of the CVT 1 moves from the point X2 towards a point X3 on the shift map in FIG. 8A.

The speed ratio of the CVT 1 after time t2 when the torque limitation is performed is the Highest speed ratio and is constant in FIG. 7, and the operating point of the CVT 1 moves along the Highest shift line in FIG. 8A, for simplicity. However, since the torque limitation and the rotation speed limitation are performed alternately as described in above, the operating point of the CVT 1 actually moves in a staircase pattern as shown in FIG. 8B.

If the oil temperature TMP of the CVT 1 becomes lower than the high oil temperature ending temperature TMP2 at time t3, the condition to end the high oil temperature control is satisfied, and the high oil temperature control ends.

After high oil temperature control ends, the usual control return processing is executed (time t3-t4), and thereby, the speed ratio of the CVT 1 and the torque of the engine 5 change to the target speed ratio and the target torque, respectively, which are determined from the present vehicle speed VSP and the present throttle opening TVO, by a predetermined change rate.

Thus, according to the above-described high oil temperature control, the high oil temperature control starts when the oil temperature TMP of the CVT 1 becomes greater than or equal to the high oil temperature control starting temperature TMP1, and first, the limitation of the input rotation speed Nin of the CVT 1 is executed by the first oil temperature lowering processing. Thereby, the oil temperature TMP of the CVT 1 can be lowered promptly.

Even if it is in a situation where the input rotation speed Nin reaches the lower limit rotation speed, and therefore, it is not possible or it is not desirable to lower the input rotation speed more, before the oil temperature TMP of the CVT 1 falls to the high oil temperature control ending temperature TMP2, according to the above-described high oil temperature control, the second oil temperature lowering processing is performed thereafter to perform torque limitation of the engine 5. Thereby, it is possible to further lower the oil temperature in the CVT 1 and to reliably lower the oil temperature TMP of the CVT 1 down to the desired temperature.

Therefore, according to the above-described high oil temperature control, it is possible to reliably lower the oil temperature TMP of the CVT 1 down to the desired temperature, and to protect the CVT 1 from high oil temperature, and to prevent the sense of discomfort which the high oil temperature control gives to the driver and the worsening of the running performance by the high oil temperature control continuing for a long time.

As for the lower limit rotation speed, it is set to the Highest rotation speed which is the input rotation speed Nin of the CVT 1 at the time when the speed ratio of the CVT 1 changes to the Highest speed ratio. Thereby, even if it is in a situation where the input rotation speed Nin reaches to the Highest rotation speed and it is not possible to lower the input rotation speed Nin any more, the torque limitation of the engine 5 is performed by the second oil temperature lowering processing, and it is possible to lower the oil temperature TMP of the CVT 1 down to the desired temperature.

Moreover, if the higher one between the Highest rotation speed, and the lower limit rotation speed for ensuring the minimum drivability which is the lower limit of the input rotation speed of the transmission in which the vehicle can run at a predetermined vehicle speed, is set as the lower limit rotation speed, even if the input rotation speed Nin reaches the lower limit rotation speed for ensuring the minimum drivability first, the second oil temperature lowering processing is executed, and therefore, the input rotation speed Nin does not become lower than the lower limit rotation speed for ensuring the minimum drivability, and it is possible to have the required running performance. For example, if only the Highest rotation speed is set as the lower limit rotation speed, in a case where the oil temperature TMP of the CVT 1 rises due to climbing a hill, the input rotation speed Nin may fall too much such that it is unable to have a driving force required for climbing the hill. However, by setting the lower limit rotation speed for ensuring the minimum drivability as the lower limit rotation speed, it is possible to avoid such a situation.

Moreover, by performing the rotation speed limitation together with the torque limitation in the second oil temperature lowering processing, it is possible to lower the oil temperature in the CVT 1 much more promptly. It is noted that in the second oil temperature lowering processing, the torque limitation and the rotation speed limitation may be performed alternately as in the above embodiments, or simultaneously. However, it is not required to use the torque limitation and the rotation speed limitation together in the second oil temperature lowering processing, and only the torque limitation may be performed.

The embodiment of the present invention has been described in the above. However, the above embodiment only shows an example of application of the present invention, and the technical scope of the present invention should not be limited to the specific arrangement of the above embodiment.

For example, the present invention is not limited to a control device of a belt type continuously variable transmission, but can be applied also to other types of continuously variable transmissions, such as a toroidal type continuously variable transmission. Moreover, the belt type continuously variable transmission may comprise a secondary transmission provided in series with the belt type continuously variable transmission. Further, a chain may be used as V belt 4.

This application claims priority based on Japanese Patent Application No. 2008-260421, filed with the Japan Patent Office on Oct. 7, 2008, the entire content of which is incorporated into this specification

What is claimed is:

1. A control device of a continuously variable transmission which changes a speed ratio continuously, the control device comprising:
    a high oil temperature control starting determination unit which determines whether an oil temperature of the continuously variable transmission is higher than a high oil temperature control starting temperature;
    a first oil temperature lowering unit which executes a first oil temperature lowering processing that limits an input rotation speed of the continuously variable transmission by changing a speed ratio of the continuously variable transmission to be smaller if it is determined that the oil temperature is higher than the high oil temperature control starting temperature by the high oil temperature control starting determination unit; and
    a second oil temperature lowering unit which ends the first oil temperature lowering processing and executes a second oil temperature lowering processing that limits a torque of an engine if the input rotation speed of the continuously variable transmission reaches a lower limit rotation speed during the first oil temperature lowering processing.

2. The control device according to claim 1, wherein
the lower limit rotation speed is an input rotation speed of the continuously variable transmission at a time when the speed ratio of the continuously variable transmission reaches a Highest speed ratio.

3. The control device according to claim 1, wherein
the lower limit rotation speed is a larger of an input rotation speed of the continuously variable transmission when the speed ratio of the continuously variable transmission reaches a Highest speed ratio and an input rotation speed of the continuously variable transmission where a vehicle equipped with the continuously variable transmission is configured to run at a predetermined vehicle speed.

4. The control device according to claim 1, wherein
the second oil temperature lowering unit limits the input rotation speed of the continuously variable transmission by reducing the speed ratio of the continuously variable transmission and limiting the torque of the engine, in the second oil temperature lowering processing.

5. A control method for a continuously variable transmission which changes a speed ratio continuously, the control method comprising:
    a high oil temperature control starting determination step for determining whether an oil temperature of the continuously variable transmission is higher than a high oil temperature control starting temperature;
    a first oil temperature lowering step for executing a first oil temperature lowering processing that limits an input rotation speed of the continuously variable transmission by changing a speed ratio of the continuously variable transmission to be smaller if it is determined that the oil temperature is higher than the high oil temperature control starting temperature by the high oil temperature control starting determination step; and
    a second oil temperature lowering step for ending the first oil temperature lowering processing and executing a second oil temperature lowering processing that limits a torque of an engine if the input rotation speed of the continuously variable transmission reaches a lower limit rotation speed during the first oil temperature lowering processing.

6. The control method according to claim 5, wherein
the lower limit rotation speed is an input rotation speed of the continuously variable transmission at a time when the speed ratio of the continuously variable transmission reaches a Highest speed ratio.

7. The control device according to claim 5, wherein
the lower limit rotation speed is a larger of an input rotation speed of the continuously variable transmission when the speed ratio of the continuously variable transmission reaches a Highest speed ratio and an input rotation speed of the continuously variable transmission where a vehicle equipped with the continuously variable transmission is configured to run at a predetermined vehicle speed.

8. The control device according to claim 5, wherein
the second oil temperature lowering step limits the input rotation speed of the continuously variable transmission by reducing the speed ratio of the continuously variable transmission and limiting the torque of the engine, in the second oil temperature lowering processing.

9. A control device of a continuously variable transmission which changes a speed ratio continuously, the control device comprising:
    a high oil temperature control starting determination means which determines whether an oil temperature of the continuously variable transmission is higher than a high oil temperature control starting temperature;
    a first oil temperature lowering means which executes a first oil temperature lowering processing that limits an input rotation speed of the continuously variable transmission by changing a speed ratio of the continuously variable transmission to be smaller if it is determined that the oil temperature is higher than the high oil temperature control starting temperature by the high oil temperature control starting determination means; and a second oil temperature lowering means which ends the first oil temperature lowering processing and executes a second oil temperature lowering processing that limits a torque of an engine if the input rotation speed of the continuously variable transmission reaches a lower limit rotation speed during the first oil temperature lowering processing.

10. The control device according to claim 9, wherein the lower limit rotation speed is an input rotation speed of the continuously variable transmission at a time when the speed ratio of the continuously variable transmission reaches a Highest speed ratio.

11. The control device according to claim 9, wherein the lower limit rotation speed is a larger of an input rotation speed of the continuously variable transmission when the speed ratio of the continuously variable transmission reaches a Highest speed ratio and an input rotation speed of the continuously variable transmission where a vehicle equipped with the continuously variable transmission is configured to run at a predetermined vehicle speed.

12. The control device according to claim 9, wherein the second oil temperature lowering means limits the input rotation speed of the continuously variable transmission by reducing the speed ratio of the continuously variable transmission and limiting the torque of the engine, in the second oil temperature lowering processing.

* * * * *